United States Patent [19]
Hanson et al.

[11] 3,952,586
[45] Apr. 27, 1976

[54] DETERMINING ENGINE COMPRESSION FROM STARTER MOTOR CURRENT

[75] Inventors: Richard Eric Hanson, Winchester; Thomas Edward Nolan, Jr., Medfield, both of Mass.

[73] Assignee: RCA Corporation, New York, N.Y.

[22] Filed: June 19, 1975

[21] Appl. No.: 588,386

[52] U.S. Cl.............................. 73/117.2; 73/116
[51] Int. Cl.²................................... G01M 15/00
[58] Field of Search............... 73/116, 117.3, 118, 73/117.2; 235/151.3

[56] References Cited
UNITED STATES PATENTS 3,421,367  1/1969  Mears et al. ........................... 73/116
3,485,093  12/1969  Muller et al. ......................... 73/116

*Primary Examiner*—Jerry W. Myracle
*Attorney, Agent, or Firm*—Edward J. Norton; Carl V. Olson

[57] ABSTRACT

Satisfactory or unsatisfactory engine compression is diagnosed by comparing the amplitude of the starter motor current, when cranking an engine having its ignition inhibited, with a reference value. The reference value is adjusted in accordance with the intake manifold absolute pressure, as determined from measurements during the test of ambient pressure and intake manifold vacuum.

10 Claims, 5 Drawing Figures

3,952,586

DETERMINING ENGINE COMPRESSION FROM STARTER MOTOR CURRENT

The invention herein described was made in the course of or under a contract or subcontract thereunder with the Department of the Army.

BACKGROUND OF THE INVENTION

It is known that the compression of an internal combustion engine can be measured by measuring the current drawn by the electric starter motor while cranking the engine with ignition inhibited. See U.S. Pat. NO. 3,839,906 issued to R. E. Hanson on Oct. 8, 1974, on an "Apparatus for Engine Compression Testing", and U.S. Pat. No. 3,765,233 issued to R. Germann on Oct. 16, 1973, on a "Device For Measuring Compression of Piston Engines." The motor current fluctuates with maximum values corresponding in time with compression strokes in the engine. The above first-mentioned patented apparatus (1) compares current peaks to determine whether some cylinders have significantly less compression than other cylinders, and, if the cylinders are substantially equal in compression, (2) measures the highest current peak relative to the current average to determine whether all cylinders have less than a satisfactory level of compression. If the first test is failed, repairs to parts of or associated with one or more individual cylinders are needed. If the second test is failed, repairs to all cylinders or parts shared by all cylinders are required.

In the second test of compression, where there is little difference between individual cylinders, the current peak corresponding with the cylinder having the highest compression is measured relative to the current average corresponding with the average compression in all cylinders. The difference between the highest peak current and the average current is substantially the same as the difference between the average of the individual current peaks and the average current.

This second test of compression compares the peak-to-average current with a known value of peak-to-average current measured while cranking an engine known to have good compression at a given (sea level) ambient pressure, and at a throttle position insuring a negligible intake manifold vacuum relative to the ambient pressure. If the test of an engine is actually performed under conditions of lower ambient (atmospheric) pressure and higher intake manifold vacuum, the peak-to-average current may be up to about 30 percent lower than the peak-to-average current would be at sea level with open throttle. A low absolute pressure at the intake manifold results in less air in the cylinder to be compressed by the piston, and consequently less resistance to the starter motor, and less starter motor current.

The significance of these pressure variations can easily be shown by example. For a vehicle at sea level with a wide open throttle, the absolute intake manifold pressure is close to 14.7 PSIA. For the same vehicle tested at high altitude (Denver, Colorado, for example) with a wide open throttle, the absolute intake manifold pressure would have dropped to about 12.2 PSIA and if the throttle were not wide open the pressure drop through the carburetor could easily drop this to about 10.0 PSIA. Thus, variations in engine test conditions, test location, and even weather could change the engine compression pressure by as much as 30%. Therefore, the compression test should take existing intake manifold pressure into account.

SUMMARY OF THE INVENTION

The compression in the cylinders of an internal combustion engine is measured by measuring the electric starter motor current when cranking the engine with ignition inhibited. The measured current is compared with a standard value which is decreased in proportion with a measured lower ambient atmospheric pressure and a measured higher intake manifold vacuum.

DESCRIPTION OF THE PREFERRED EMBODIMENT

Figure 1:
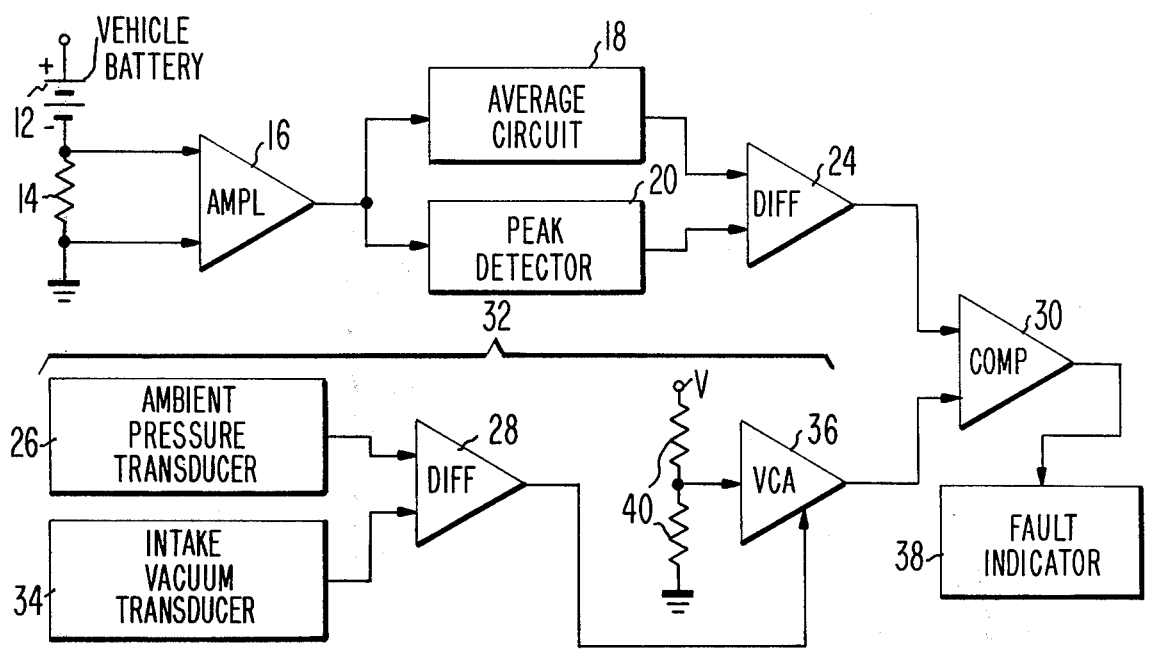
FIG. 1 is a diagram of an apparatus for testing compression in an internal combustion engine.

Referring now to FIG. 1, an engine compression fault detector is shown in conjunction with a battery 12 and a shunt 14 as would be provided in a typical engine starter motor electrical system. The positive terminal of battery 12 is adapted for coupling to a starter motor (not shown) by way of a solenoid switch (not shown). the negative terminal of battery 12 is coupled to The by way of shunt 14. Shunt 14, which functions to provide a signal indicative of the starter motor current waveform, typically takes the form of a relatively small resistance, such as, for example, a resistance device constructed to develop 100 mv when passing 50 amps of current. However, it will be appreciated by those skilled in the art that various other means for detecting the starter motor current waveform may be provided. For example, a current probe which is inductively or directly coupled to the starter motor input lead, or battery lead, may be utilized in order to provide a similar signal. Further, even the battery cable itself, since it too exhibits a small but finite resistance, can be utilized as a suitable shunt resistance.

The signal developed across shunt 14 is coupled as a first input to differential amplifier 16. The second input of amplifier 16 is coupled to ground. Accordingly, the output of amplifier 16 provides an amplified version of the signal developed by shunt 14. The output of amplifier 16 is coupled as an input to an averaging circuit 18, a peak detector 20. Averaging circuit 18 and peak detector 20 may be each constituted by a simple R-C time constant circuit and an operational amplifier with appropriate feedback, or by any other suitable known means.

The output of averaging circuit 18 is coupled as a first input to a differential amplifier 24, and the output of peak detector 20 is coupled as a second input to amplifier 24. The output of differential amplifier 24 is coupled as a first input to a comparator 30. The second input to comparator 30 is provided by reference means 32. The output of comparator 30 is coupled to a fault indicator 38.

The reference means 32 includes a conventional ambient atmospheric pressure transducer 26 having an electrical output which is coupled to an input of a differential amplifier 28. The transducer 26 is positioned at any place convenient to the engine being tested, and it provides an electrical output which is a measure of atmospheric pressure, which may be between about 14.8 and 12.0 pounds per square inch, absolute. Another input to the differential amplifier 28 is provided by a conventional intake manifold vacuum transducer 32 which is mounted in the intake manifold of the engine, and which provides an electrical output proportional to the difference between the absolute ambient atmospheric pressure and the absolute intake manifold pressure. The difference between the output of transducers 26 and 34 represents the actual absolute pressure in the intake manifold.

The reference means 32 also includes a conventional voltage-controlled amplifier 36 which receives a reference voltage from the voltage divider 40. The reference voltage has a value such that the output of voltage-controlled amplifier 36 normally represents the starter motor peak-to-average voltage of a good engine at sea level with the throttle open. If the ambient pressure transducer 26 indicates a lower atmospheric pressure, and/or the intake vacuum transducer 34 indicates an obstructed throttle passageway, then the resulting signal from differential amplifier 28 causes a proportional reduction in the amplitude of the voltage reference signal output of the voltage-controlled amplifier 36.

Figure 3:
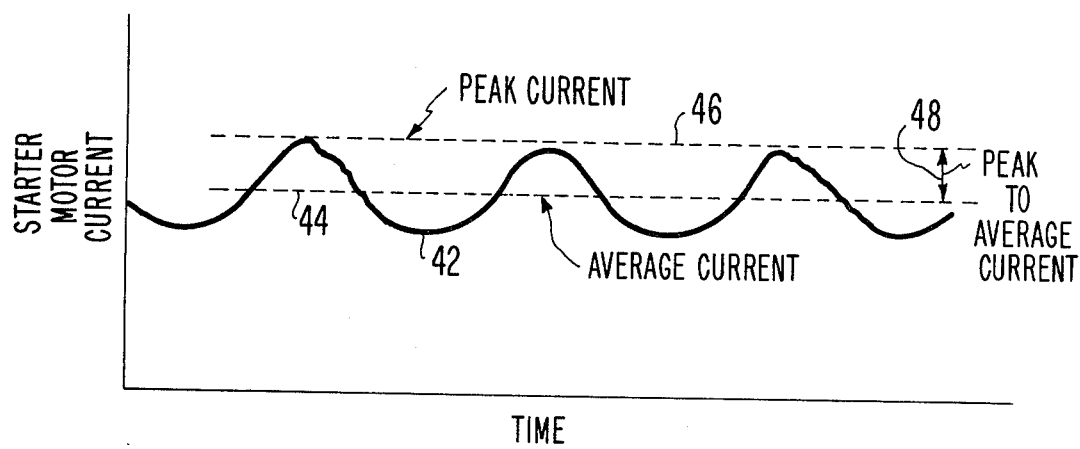
FIG. 3 is a chart of starter motor current fluctuations during the cranking of an engine.

In the operation of the compression test apparatus of FIG. 1, the engine is cranked by the starter motor with ignition inhibited. The starter motor current as measured by shunt 14 and amplified by amplifier 16 may appear, after initial transients have died down, as shown by curve 42 in FIG. 3. The averaging circuit 18 derives a voltage representing the average current 44, and the peak detector 20 derives a voltage representing the peak current 46. The output of differential amplifier 24 represents the peak-to-average current 48. At the same time, the reference means 32 produces a reference voltage at the output of voltage-controlled amplifier 36 for comparison in comparator 30 with the voltage representing measured peak-to-average voltage. The reference voltage from amplifier 36 is modified by the outputs of the transducers 26 and 34, in a manner which has been described, so that the reference value is adjusted to be appropriate for the pressure conditions existing at the time and place of the test. The comparator 30 then produces an output to fault indicator 38 such that the satisfactory or unsatisfactory condition of compression in the engine is displayed.

Figure 2:
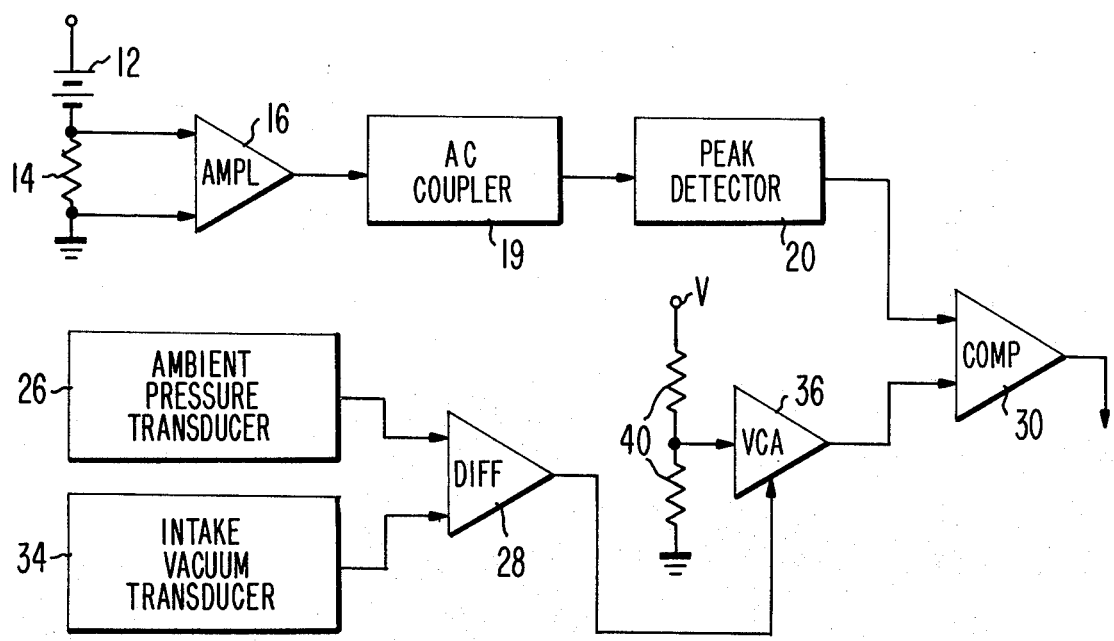
FIG. 2 is a diagram of an alternative apparatus.

FIG. 2 shows an alternative and simpler apparatus in which the averaging circuit 18 and the differential amplifier 24 are replaced by an a.c. coupler 19. The coupler 19 separates the fluctuations of the waveform 42 from the average d-c value 44 so that the peak detector 20 can directly derive the peak-to-average value 48. The operation of the apparatus of FIG. 2 is otherwise the same as has been described in connection with FIG. 1.

Figure 4:
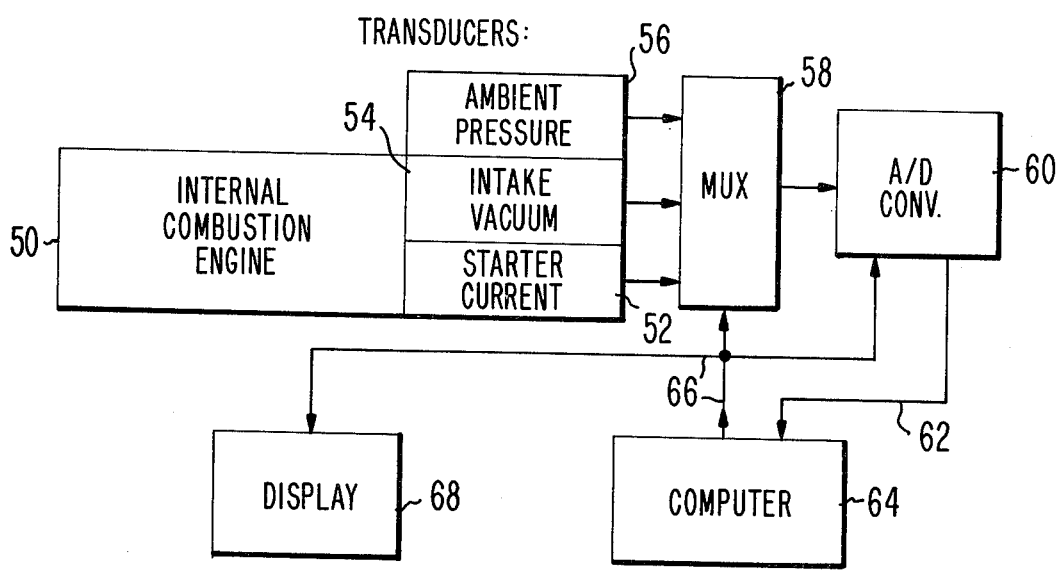
FIG. 4 is a diagram of another apparatus, including a computer, for testing compression in an internal combustion engine.

FIG. 4 shows another alternative apparatus for testing compression. An internal combustion engine is provided with a conventional starter current transducer 52, and a conventional intake manifold vacuum transducer 54. A conventional ambient atmospheric pressure transducer is provided at or near the engine. The electrical signal outputs of the three transducers are applied through a conventional multiplex unit 58 and a conventional analog-to-digital converter 60 to the input bus 62 of a computer 64. An output bus 66 from the computer leads to the multiplexer 58, the converter 60, and to a display unit 68.

The computer 64 may, by way of example only, be a "Nova 1200" minicomputer manufactured and sold by Data General Corporation, Southboro, Massachusetts, Zip 01772. The Nova 1200 is a low cost minicomputer designed for general purpose applications. It has a 16-bit word, multi-accumulator central processor, and a full memory cycle time of 1200 nanoseconds. It executes arithmetic and logic instructions in 1350 nanoseconds. The entire Nova 1200 central processor fits on a single 15-inch-square printed circuit subassembly board. The basic computer includes four thousand 16-bit words of core memory, a Teletype interface, programmed data transfer, automatic interrupt source identification, and a direct memory access channel. User programming conveniently can be in the BASIC language.

The display device 68 for use with the Nova 1200 computer may be a conventional Teletypewriter, a printer, a 4-digit display such as one including Numitron character display tubes, or any other similar display device.

The computer-controlled apparatus of FIG. 4 diagnoses the mechanical conditions in a piston engine which affect compression by performing the following steps:

1. Measuring the amplitudes of a large number of successive samples of the starter motor current when cranking the engine with ignition inhibited.
2. Computing the average value of the large number of samples.
3. Selecting the largest amplitude one of the large number of samples.
4. Subtracting the average value from the peak value to provide a peak-to-average value.
5. Measuring the ambient pressure.
6. Measuring the intake manifold vacuum relative to the ambient pressure.
7. Subtracting the intake manifold vacuum from the ambient pressure to provide an intake manifold absolute pressure.
8. Multiplying a known value of starter motor peak-to-average current when cranking a good engine operating with a given intake manifold absolute pressure by the ratio of said measured intake manifold absolute pressure divided by said given intake manifold absolute pressure, to provide an adjusted value, and
9. Comparing said measured starter motor peak-to-average current with said adjusted value of starter motor peak-to-average current.

Figure 5:
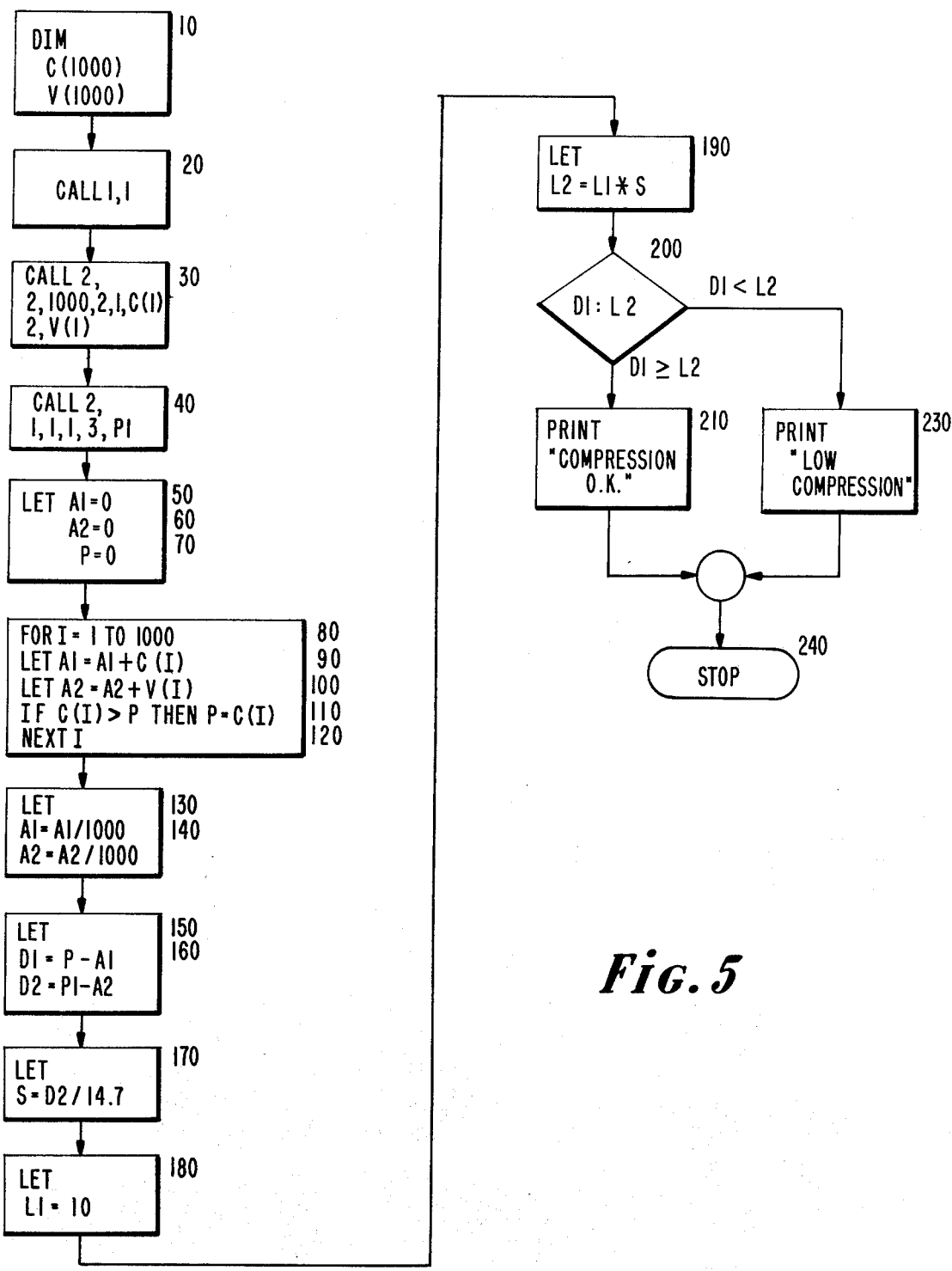
FIG. 5 is a flow chart of the computer program used in the apparatus of FIG. 4.

Reference is now made to FIG. 5, which is a computer program flow chart of the program employed in the computer 64 in FIG. 4 to perform the engine compression test performed also by the apparatus of FIG. 1. The flow chart contains numbers beside the boxes therein. The numbers identify sequential statements and functions, which are as follows:

| Statement Nos. | Statement and Function |
| --- | --- |
| 10 | DIM C(1000), V(1000). Execution of this statement simply allocates memory space within the computer for data arrays to be used by the computer during test operation. |
| 20 | CALL 1, 1. This statement causes the computer to execute special purpose control subroutine number 1. This subroutine sets the computer |

| Statement Nos. | Statement and Function |
|---|---|
| | real time clock to a 1 msec step rate so that it can be used for triggering data samples from the A/D. |
| 30 | Call 2,2, 1000, 2, 1, C(1), 2, V(1). This statement causes the computer to execute special purpose control subroutine number 2. The subroutine format is CALL 2, S1, S2, S3, C1, C2, C3, C4, where<br>S1 = Time interval (in integer number of msec) between start of block samples<br>S2 = Number of samples<br>S3 = Number of channels to be sampled for each block sample<br>C1 = Number of first channel to be sampled where<br>    Channel 1 = Starter Current<br>    Channel 2 = Intake Manifold Vacuum<br>    Channel 3 = Ambient Pressure<br>C2 = Parameter name where first data point corresponding to channel C1 should be stored<br>C3 = Number of second channel to be sampled<br>C4 = Parameter name where first data point corresponding to channel C2 should be stored.<br>Thus, statement 30 instructs the computer to sample channels 1 and 2, every 2 msec, 1000 times, and to store the data as C(1000) and V(1000). |
| 40 | CALL 2, 1, 1, 1, 3, P1. This statement is similar to statement 30 except that it instructs the computer to sample channel 3 only one time and to store the data as P1. |
| 50 | LET A1 = 0 |
| 60 | LET A2 = 0 |
| 70 | LET P = 0. This group of instructions initializes the three parameters A1, A2 and P to zero. A1 is used for average starter current calculations. A2 is used for average intake manifold vacuum calculations. P is used for peak starter current calculations (peak to be measured only after steady state cranking has been obtained). |
| 80 | FOR I = 1 TO 1000. |
| 90 | LET A1 = A1 + C(I). |
| 100 | LET A2 = A2 + V(I). |
| 110 | IF C(I) > P THEN LET P = C(I). |
| 120 | NEXT I. This set of instructions forms an instruction loop that is repeated 1000 times while incrementing the parameter I from 1 to 1000. Instructions 90, 100, and 110 are thus repeated 1000 times such that upon completion of this group of instructions A1 is the sum of all values of C(I), A2 is the sum of all values of V(I), and P is equal to the largest value within the C(I) array. |
| 130 | LET A1 = A1/1000. |
| 140 | LET A2 = A2/1000. These two instructions calculate average values. After their execution A1 is equal to the average starter current and A2 is equal to the average intake manifold vacuum. |
| 150 | LET D1 = P − A1. |
| 160 | LET D2 = P1 − A2. These two instructions perform difference calculations where D1 is the difference between the peak starter current, P, and the average starter current, A1, and D2 is the average absolute pressure within the intake manifold found by subtracting the average vacuum measurement, A2 from the ambient pressure measurement, P1. |
| 170 | LET S = D2/14.7. This instruction calculates a scale factor, S, which is used to appropriately lower the test limit if the absolute intake manifold pressure is low. If there are no intake restrictions, the throttle is wide open, and the test is done near sea level D2 will be close to 14.7 PSIA so the scale factor will be nearly one. However, if the absolute intake manifold pressure is 25% low (D2 = 11 PSIA), then S will be equal to 0.75 scaling the test limit down 25% to match. |
| 180 | LET L1 = 10. This statement simply sets the nominal peak-to-average starter current test limit to 10 amps. |
| 190 | LET L2 = L1*S. This statement multiplies the nominal test limit, L1, by the scale factor, S, to produce the compensated test limit L2. |
| 200 | IF D1<L2 THEN GO TO 230. This statement performs the actual test function. If the compression is too low, the starter current fluctuations will be low so that the peak-to-average difference, D1, will be less than the compensated limit L2 and the computer will jump to statement 230 to print out the bad news. Otherwise, the computer will execute the next sequential instruction, 210, to print the good news. |
| 210 | PRINT "COMPRESSION O.K.". |
| 220 | GO TO 240. |
| 230 | PRINT "LOW COMPRESSION" |
| 240 | STOP. The computer either executes statement 210 and prints "COMPRESSION O.K." or executes statement 230 and prints "LOW COMPRESSION". In either case it then goes to instruction 240 where execution stops as indicated. |

The hardware apparatus of FIG. 1 and the program-controlled apparatus of FIG. 5 perform the same functions, as shown by the following comparison:

| Hardware Circuit Modules of FIG. 1 | | Software Instructions of FIG. 6 |
|---|---|---|
| Averaging Circuit | 18 | 50, 80, 90, 120, 130 |
| Peak Detector | 20 | 70, 80, 110, 120 |
| Differential Amp. | 24 | 150 |
| Differential Amp. | 28 | 160 |
| Compression Test Limit Resistors | | 180 |
| Voltage Controlled Amp | 36 | 190 |
| Comparator | 30 | 200 |
| Fault Indicator | 38 | 230 |

What is claimed is:

1. Apparatus for testing compression in an internal combustion engine having a starter motor and a source of current therefore, comprising
    means for detecting the starter motor current waveform when the engine is cranked with the ignition inhibited, the waveform having cycles corresponding with compression cycles in individual cylinders,
    means for generating a starter motor current signal corresponding with the amplitude of cycles of said current waveform,
    means for transducing the intake manifold absolute pressure to a corresponding measured intake absolute pressure electrical signal,
    a source of a reference signal corresponding with the starter motor current in a reference good engine operated at a given intake manifold absolute pressure,
    means to adjust said reference signal in the ratio of the measured intake absolute pressure signal to the given intake absolute pressure, and
    means to compare said measured starter motor current signal with said adjusted starter motor current reference signal.

2. Apparatus as defined in claim 1 wherein said means for tranducing the intake manifold absolute pressure includes
    means for transducing the ambient atmospheric pressure to a corresponding electrical signal,
    means for transducing the intake manifold vacuum to a corresponding electrical signal, and
    means for subtracting the intake vacuum signal from the ambient pressure signal to provide a measured intake manifold absolute pressure signal.

3. Apparatus as defined in claim 1 wherein said means for generating a starter motor current signal includes an averaging circuit, a peak detector and a differential amplifier.

4. Apparatus as defined in claim 1 wherein said means for generating a starter motor current signal includes an a-c coupler and a peak detector.

5. Apparatus as defined in claim 1 wherein said given intake manifold absolute pressure is about 14.7 pounds per square inch.

6. The method of determining the mechanical conditions in an engine which affect compression, comprising the steps of
  measuring the amplitude of the starter motor current when cranking the engine with ignition inhibited,
  measuring the intake manifold absolute pressure,
  multiplying a known value of starter motor current when cranking a good engine operating with a given intake manifold absolute pressure by the ratio of said measured intake manifold absolute pressure divided by said given intake manifold absolute pressure, to provide an adjusted value, and
  comparing said measured starter motor current with said adjusted value of starter motor current.

7. The method as defined in claim 6 wherein said step of measuring the intake manifold absolute pressure includes the steps of
  measuring the ambient pressure,
  measuring the intake manifold vacuum relative to the ambient pressure, and
  subtracting said intake manifold vacuum from said ambient pressure.

8. The method as defined in claim 6 wherein said step of measuring the amplitude of the starter motor current when cranking the engine includes the steps of
  measuring the amplitudes of a large number of successive samples of the starter motor current, and
  selecting the largest amplitude one of said samples.

9. The method as defined in claim 8, and in addition the steps of determining the average amplitude of said large number of samples, and
  subtracting said average amplitude from said largest amplitude one of said samples.

10. The method as defined in claim 6 wherein said given intake manifold absolute pressure is the 14.7 psi ambient pressure at sea level.

* * * * *

UNITED STATES PATENT OFFICE
CERTIFICATE OF CORRECTION

PATENT NO. : 3,952,586
DATED : April 27, 1976
INVENTOR(S) : Richard Eric Hanson, et al It is certified that error appears in the above-identified patent and that said Letters Patent are hereby corrected as shown below:

Column 2, line 33, "The" should be -- ground --.

Signed and Sealed this fifteenth Day of June 1976

[SEAL]

Attest:

RUTH C. MASON
Attesting Officer

C. MARSHALL DANN
Commissioner of Patents and Trademarks